US006321546B1

(12) United States Patent
Johnson et al.

(10) Patent No.: US 6,321,546 B1
(45) Date of Patent: Nov. 27, 2001

(54) HEAT TRANSFER SYSTEM

(76) Inventors: Douglas E. Johnson, 5511 Legacy Crescent Pl., #102, Riverview, FL (US) 33569; Jon Lucas, 3902 Corporex Park Dr., Suite 300, Tampa, FL (US) 33619

( * ) Notice: Subject to any disclaimer, the term of this patent is extended or adjusted under 35 U.S.C. 154(b) by 0 days.

(21) Appl. No.: 09/850,029

(22) Filed: May 7, 2001

Related U.S. Application Data

(63) Continuation-in-part of application No. 09/613,077, filed on Jul. 10, 2000.

(51) Int. Cl.[7] ..................................................... F25B 29/00
(52) U.S. Cl. ................................................................. 62/173
(58) Field of Search ..................... 62/173, 132, 90, 62/428; 162/223

(56) References Cited

U.S. PATENT DOCUMENTS

| | | | | |
|---|---|---|---|---|
| 4,214,454 | * | 7/1980 | Taylor | 62/173 |
| 4,572,785 | * | 2/1986 | Braaten | 210/181 |
| 4,939,906 | * | 7/1990 | Spatz et al. | 62/94 |
| 5,040,375 | * | 8/1991 | Dobeln | 62/94 |
| 5,309,725 | * | 5/1994 | Cayce | 62/90 |
| 5,339,654 | * | 8/1994 | Cook et al. | 62/476 |
| 5,400,607 | * | 3/1995 | Cayce | 62/90 |
| 5,533,362 | * | 7/1996 | Cook et al. | 62/476 |
| 5,546,760 | * | 8/1996 | Cook et al. | 62/497 |
| 5,771,710 | * | 6/1998 | Erickson | 62/494 |

* cited by examiner

*Primary Examiner*—Teresa Walberg
*Assistant Examiner*—Daniel Robinson

(57) ABSTRACT

A heat transfer system first includes an air conditioner which includes an evaporator. The system further includes a chamber having an air duct including an input end for receiving fresh ambient make up air and for also receiving recycled air. The air duct also includes an output end to move conditioned air passed the evaporator and into the chamber, with intermediate zones between the input end and the output end. The intermediate zones include a return air zone, a make up air zone, an air handler zone, and an air supply zone. The system also includes a distiller with an input end to receive water from a feed water source, an outputs, an exhaust chimney to direct the flow of excess heat and recycled air to atmosphere or for recirculation, and a heater element. Furthermore, the system includes a passive transfer assembly having a pair of ends with a coil at each end thereof and a pair of lines connecting the coils there between forming a closed loop for a second working fluid to pass. The first heated end is located in operative association with the exhaust chimney of the distiller and the second chilled end located in operative association with the second output end of the air duct.

13 Claims, 9 Drawing Sheets

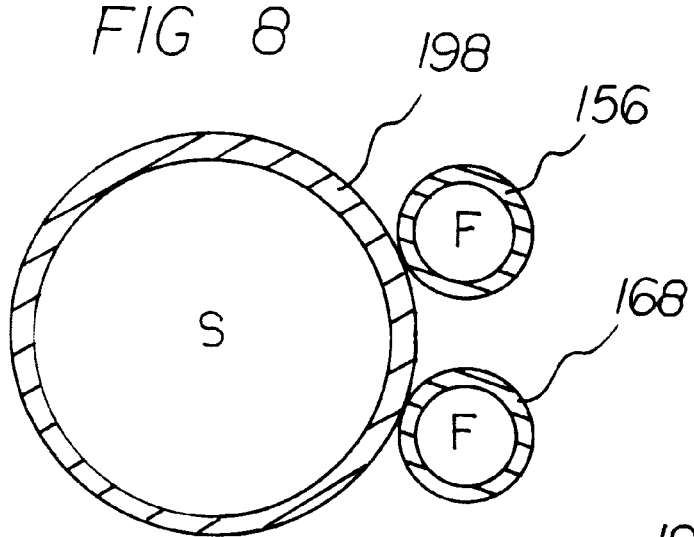
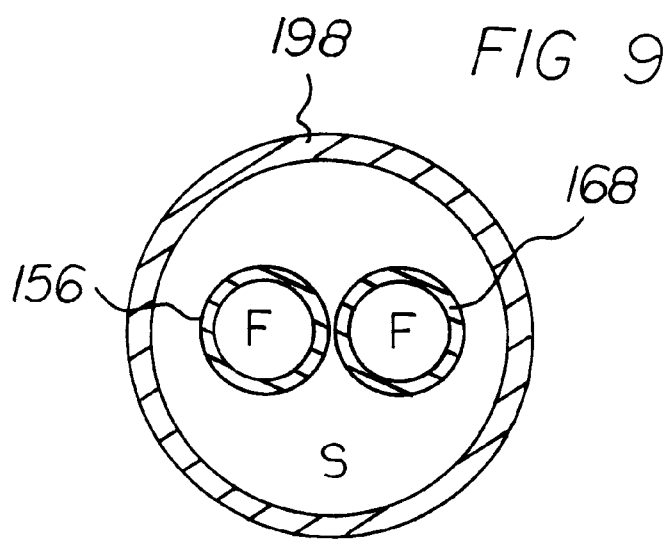
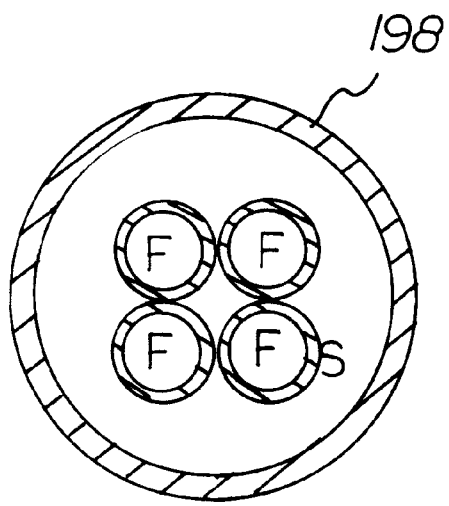

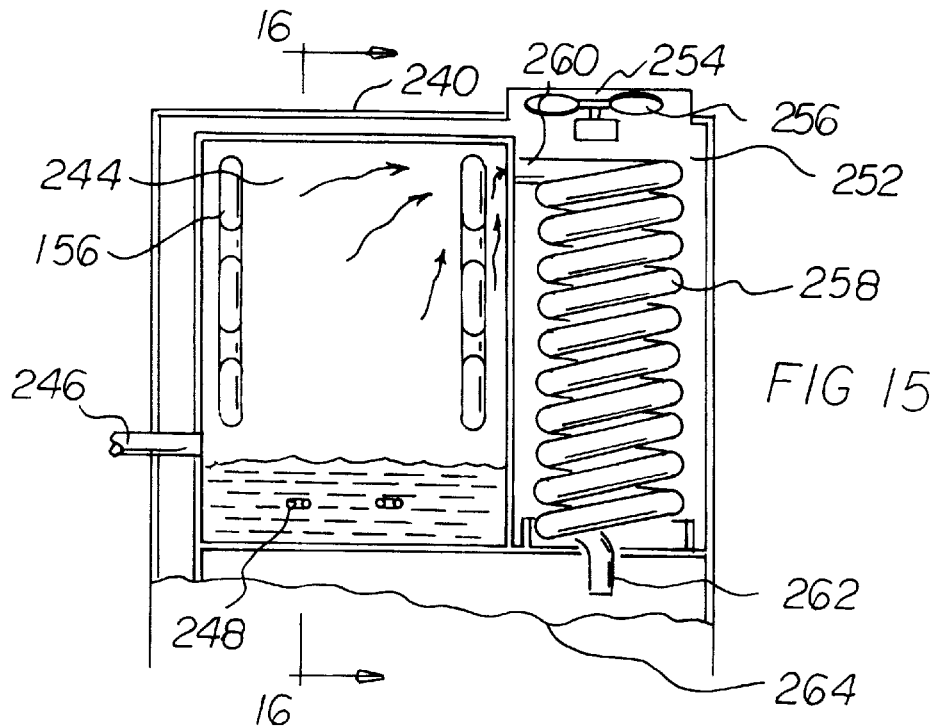
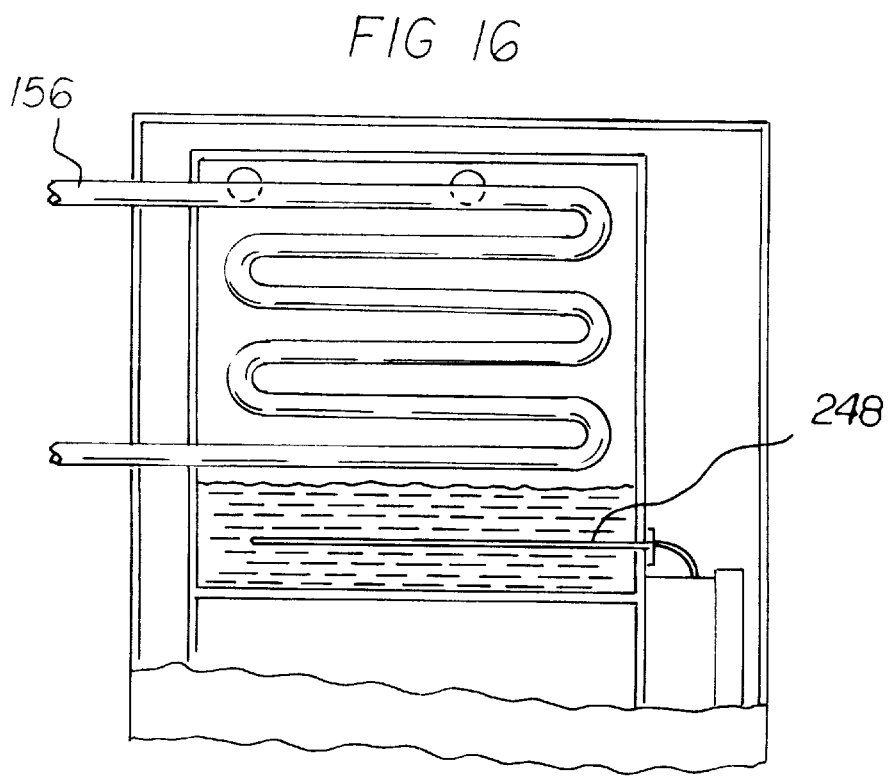

HEAT TRANSFER SYSTEM

Related Application

The present application is a continuation in part of co-pending application Ser. No. 09/613,077 filed on Jul. 10, 2000.

BACKGROUND OF THE INVENTION

1. Field of the Invention

The present invention relates to a heat transfer system and more particularly pertains to optimizing the heat gained and lost when air conditioning and purifying water.

2. Description of the Prior Art

The use of heat transfers systems of known designs and configurations is known in the prior art. More specifically, heat transfer systems of previously known designs and configurations previously devised and utilized for the purpose of handling heat in thermal systems through know methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,939,906 to Spatz et al. relating to a gas-fired desiccant regenerator/interchanger heat exchanger. U.S. Pat. No. 5,040,375 to Von Dobeln discloses a method and devise for conditioning of a gas which passes through the treatment zone in a regenerative moisture exchanging apparatus. Lastly, U.S. Pat. No. 5,771,710 to Erickson discloses a absorption step of a continuous absorption cycle apparatus in externally cooled by an air-cooled thermosyphon having hot end air-cooled end and reservoir.

While these devices fulfill their respective, particular objectives and requirements, the aforementioned patents do not describe a heat transfer system that allows optimizing the heat gained and lost when air conditioning and purifying water.

In this respect, the heat transfer system according to the present invention substantially departs from the conventional concepts and designs of the prior art, and in doing so provides an apparatus primarily developed for the purpose of optimizing the heat gained and lost when air conditioning and purifying water.

Therefore, it can be appreciated that there exists a continuing need for a new and improved heat transfer system which can be used for optimizing the heat gained and lost when air conditioning and purifying water. In this regard, the present invention substantially fulfills this need.

SUMMARY OF THE INVENTION

In view of the foregoing disadvantages inherent in the known types of heat transfer systems of known designs and configurations now present in the prior art, the present invention provides an improved heat transfer system. As such, the general purpose of the present invention, which will be described subsequently in greater detail, is to provide a new and improved heat transfer system and method which has all the advantages of the prior art and none of the disadvantages.

To attain this, the present invention essentially comprises a heat transfer system comprises an air conditioner for manipulating temperature and circulating air. The air conditioner components include an expansion valve, an evaporator, a compressor, a condenser, a closed line with a working fluid therein operatively coupling such component. The compressor increases the pressure of the working fluid thus raising the temperature of the working fluid. The condenser then releases this heat into an environment adjacent the condenser preferably into an external environment then the working fluid passes through the expansion valve, the pressure of the working fluid is then dropped which in turn lowers the temperature. The cool working fluid then passes through the evaporator where the working fluid absorbs heat from an environment adjacent to the evaporator, preferably an internal environment before entering the compressor again. The system also has a chamber having an air duct comprised of an input end for receiving fresh ambient make up air and for also receiving recycled air. An output end of the air duct moves conditioned air passed the evaporator and into the chamber and the air duct has intermediate zones between the input end and the output end. The intermediate zones include a return air zone which collects recycled air and heat. A make up air zone which collects ambient make up air. An air handler zone which comprises the air conditioner evaporator and allows the ambient make up air and recycled air to come in contact with the evaporator of the air conditioner. The last intermediate zone is an air supply zone which controls the air flow of the ambient make up air and recycled air with a fan to move the air to the output end of the air duct. Next, the system includes a distiller for purifying water through heat vaporization with an input end to receive water from a feed water source. The distiller includes outputs having a first line to pass purified water to a hot water tank, a second line to feed water to a cold water supply and a third line to feed water to a chilled water loop. Next, the distiller includes an exhaust chimney to direct the flow of excess heat and recycled air to atmosphere or for recirculation. Finally, the distiller includes a heater element to effect the water purification through distillation within the distiller. Next, the system includes a conduit with a hollow configuration adapted to carry the excess heat and recycled air from the exhaust chimney. The chimney has an input region coupled to the exhaust chimney of the distiller and an output region adapted to couple to the return air zone of the air duct when in a first mode. The output region is also adapted to route the heat and recycled air to the environment outside the chamber when in a second mode with a damper movable between the first and second mode. The conduit transfers the heat and recycled air from the distiller to the ambient make up air of the return side of the evaporator and make up air zone of the air duct and drives the moisture from the ambient make up air. Finally, the conduit is adapted to transfer the heat to outside the chamber when the air conditioner is not in use and the damper is engaged. Next, the system includes a thermosyphon having a pair of ends with a coil at each end thereof and a pair of lines connecting the coils there between forming a closed loop for a second working fluid to pass. The first heated end being located in operative association with the exhaust chimney of the distiller and the second chilled end located in operative association with the second output end of the air duct. The line having a control valve adapted to be controlled manually and by a humidostat to manipulate the degree of reheating done to the conditioned output air of the air supply zone. The excess heat of the exhaust chimney of the distiller adapted to raise the temperature of the second working fluid of the first heated end of the thermosyphon which is adapted to lower the temperature of the second working fluid at the second chilled end which in turn will absorb heat from conditioned out put air at the air supply zone. Finally, the system includes a secondary hot water tank fed by water from the distiller by a line and a secondary thermosyphon to heat the water in the secondary hot water tank.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved heat transfer system which has all of the advantages of the prior art heat transfer systems of known designs and configurations and none of the disadvantages.

It is another object of the present invention to provide a new and improved heat transfer system which may be easily and efficiently manufactured and marketed.

It is further object of the present invention to provide a new and improved heat transfer system which is of durable and reliable constructions.

An even further object of the present invention is to provide a new and improved heat transfer system which is susceptible of a low cost of manufacture with regard to both materials and labor, and which accordingly is then susceptible of low prices of sale to the consuming public, thereby making such heat transfer system economically available to the buying public.

Even still another object of the present invention is to provide a heat transfer system for optimizing the heat gained and lost when air conditioning and purifying water.

Lastly, it is an object of the present invention to provide a new and improved heat transfer system first comprises an air conditioner which includes an evaporator. The system further includes a chamber having an air duct comprised of an input end, an output end and intermediate zones there between. The intermediate zones include a return air zone, a make up air zone, an air handler zone, and an air supply zone. The system also includes a distiller which has an input end, an outputs, an exhaust chimney and a heater element. Furthermore, the system includes a passive transfer assembly having a pair of ends with a coil at each end thereof and a pair of lines connecting the coils there between forming a closed loop for a second working fluid to pass. The first heated end is located in operative association with the exhaust chimney of the distiller and the second chilled end is located in operative association with the second output end of the air duct.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 8 is a cross sectional view of the coils shown in FIG. 7.

FIG. 9 is a cross sectional view of an alternative arrangement of the coils.

FIG. 10 is a cross sectional view of another alternative arrangement of the coils.

FIG. 15 is a cross sectional illustration of a further embodiment of a distiller.

FIG. 16 is a cross sectional illustration taken along line 16—16 of FIG. 15.

The same reference numerals refer to the same parts throughout the various Figures.

DESCRIPTION OF THE PREFERRED EMBODIMENT

Figure 1:
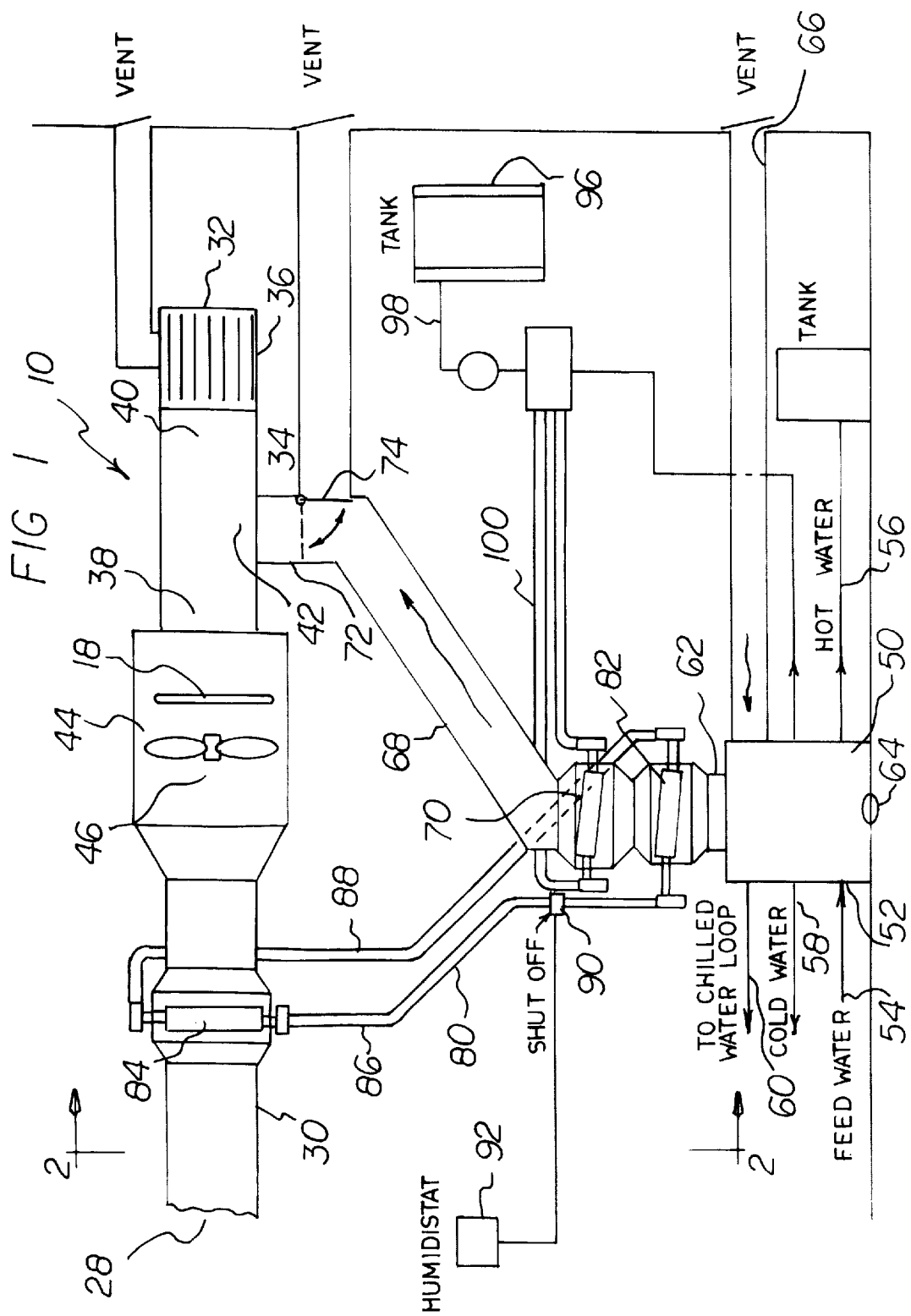
FIG. 1 is schematic illustration of the new and improved heat transfer system constructed in accordance with the principles of the present invention.

With reference now to the drawings, and in particular to FIG. 1 thereof, the preferred embodiment of the new and improved heat transfer system embodying the principles and concepts of the present invention and generally designated by the reference numeral 10 will be described.

The present invention, the heat transfer system is comprised of a plurality of components.

Figure 3:
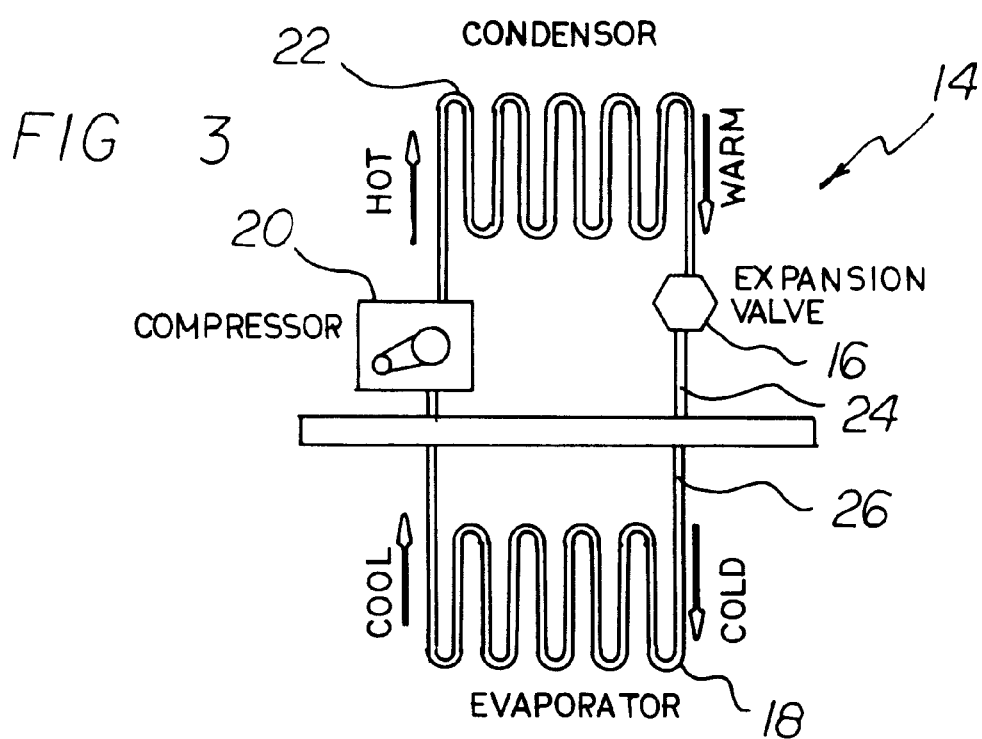
FIG. 3 is a schematic illustration of the air conditioner of FIGS. 1 and 2.

The heat transfer system includes an air conditioner 14 for manipulating temperature and circulating air. The primary components of the air conditioner include an expansion valve 16, an evaporator 18, a compressor 20, a condenser 22, a closed line 24 with a working fluid 26 therein operatively coupling such components. Such components are shown in FIG. 3. The compressor increases the pressure of the working fluid thus raising the temperature of the working fluid. The condenser then releases this heat into an environment adjacent the condenser preferably into an external environment. The working fluid then passes through the expansion valve. This causes the pressure of the working fluid to drop which in turn lowers the temperature. The cool working fluid then passes through the evaporator where the working fluid absorbs heat from an environment adjacent to the evaporator preferably an internal environment before the working fluid enters the compressor again.

The heat transfer system further includes a chamber 28 This chamber has an air duct 30 with of an input end 32 for receiving fresh ambient make up air 34 and for also receiving recycled air 36. The air duct is also comprised of an output end 38 to move conditioned air passed the evaporator and into the chamber. The air duct is further comprised of intermediate zones between the input end and the output end. The intermediate zones include a return air zone 40 which collects recycled air and heat. A make up air zone 42 collects ambient make up air. An air handler zone 44 comprises the air conditioner evaporator and allows the ambient make up air and recycled air to come in contact with the evaporator of the air conditioner. An air supply zone 46 controls the air flow of the ambient make up air and recycled air. A fan in the air supply zone moves the air to the output end of the air duct.

The heat transfer system next includes a distiller 50 that purifies water through heat vaporization. The distiller has an input end 52 to receive water from a feed water source 54. The distiller further has outputs which first includes a first line 56 to pass purified water to a hot water tank. The distiller outputs further include a second line 58 to feed water to a cold water supply and a third line 60 to feed water to a chilled water loop. The distiller is further equipped with an exhaust chimney 62 to direct the flow of excess heat and recycled air to atmosphere or for recirculation. Additionally, the distiller includes a heater element 64 to effect the water purification through distillation within the distiller. Lastly, a vent with an air inlet 66 allows for introducing ambient air to the distiller.

Figure 2:
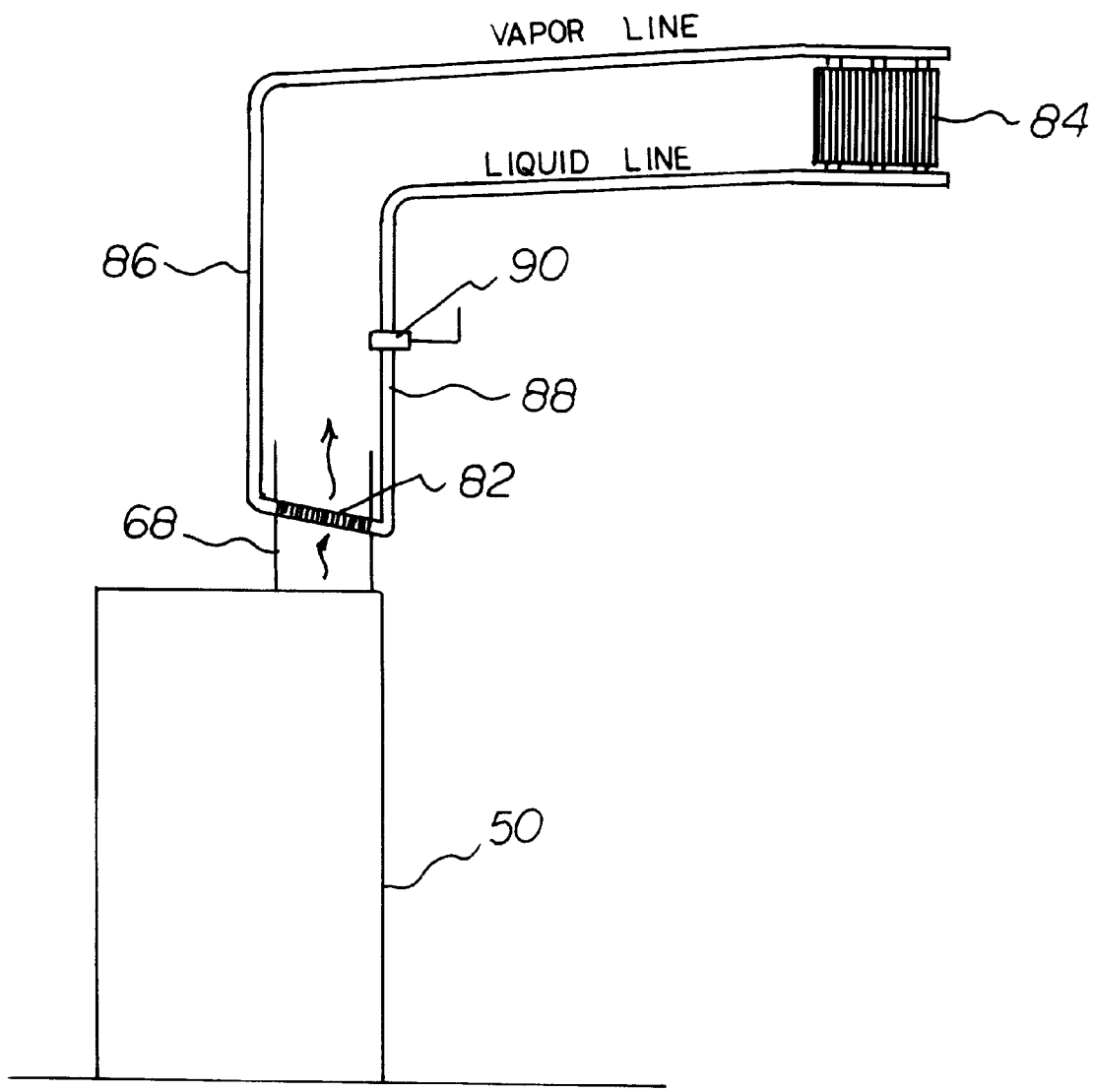
FIG. 2 is a schematic illustration taken along line 2—2 of FIG. 1.

The system next has a conduit 68 as shown in FIG. 2 with a hollow configuration. This conduit is adapted to carry the excess heat and recycled air from the exhaust chimney. The conduit has an input region 70 coupled to the exhaust chimney of the distiller. The conduit further has an output region 72 adapted to couple to the return air zone of the air duct when in a first mode. The output region is also adapted to route the heat and recycled air to the environment outside the chamber when in a second mode. A movable damper 74 fluctuates between the first and second mode. The conduit transfers the heat and recycled air from the distiller to the ambient make up air of the return side of the evaporator and make up air zone of the air duct. The transferred heat drives the moisture from the ambient make up air and also provides heat to the internal environment of the chamber. Finally, the conduit is adapted to transfer the heat to outside the chamber when the air conditioner is not in use and the damper is engaged and in the second mode.

Figure 4:
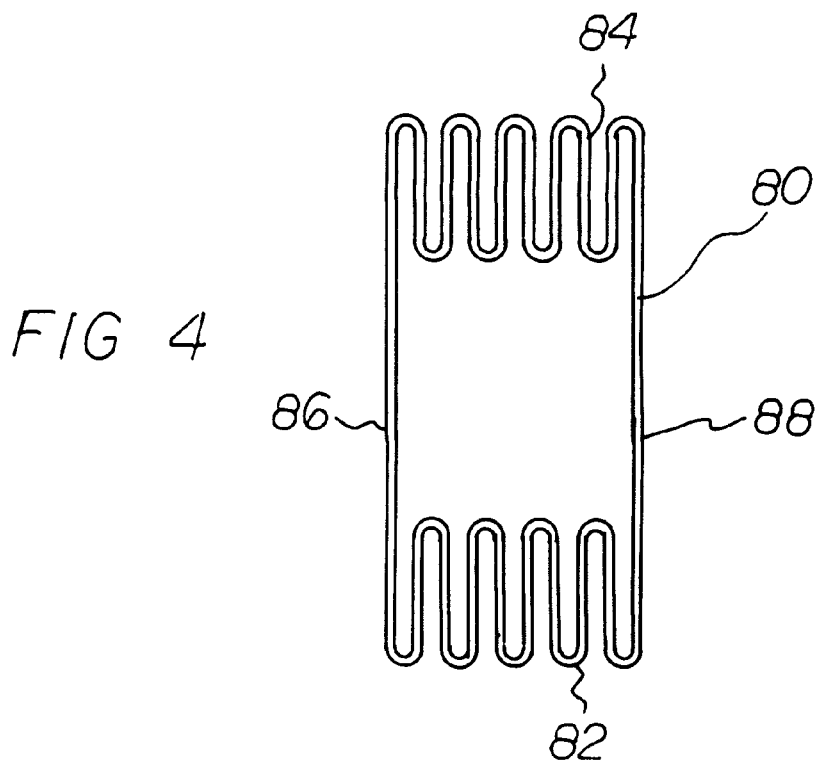
FIG. 4 is a perspective illustration of the primary thermosyphon shown in FIG. 1.

The system further includes a passive transfer assembly, preferably a thermosyphon 80. The thermosyphon, as shown in FIG. 4, has a pair of ends with a coil 82, 84 at each end thereof and a pair of lines 86, 88 connecting the coils there between forming a closed loop for a second working fluid to pass. The first heated end is located in operative association with the exhaust chimney of the distiller. The second chilled end is located in operative association with the second output end of the air duct. The line has a control valve 90 adapted to be controlled manually and by a humidostat 92 to manipulate the degree of reheating done to the conditioned output air of the air supply zone. The excess heat of the exhaust chimney of the distiller is adapted to raise the temperature of the second working fluid of the first heated end of the thermosyphon which is adapted to lower the temperature of the second working fluid at the second chilled end which in turn will absorb heat from conditioned out put air at the air supply zone.

Lastly the system includes a secondary hot water tank 96 that is fed by water from the distiller by a line 98 and a secondary thermosyphon 100 to heat the water in the secondary hot water tank.

In a typical operating example, ambient air to the evaporator could be between 74 and 90, preferably 80, degrees Fahrenheit. The temperature after the evaporator would be about 55 degrees Fahrenheit. The temperature after the thermosyphon would be about 61 degrees Fahrenheit at 800 cubic feet per minute for delivery to a chamber at 72 degrees Fahrenheit.

Figure 5:
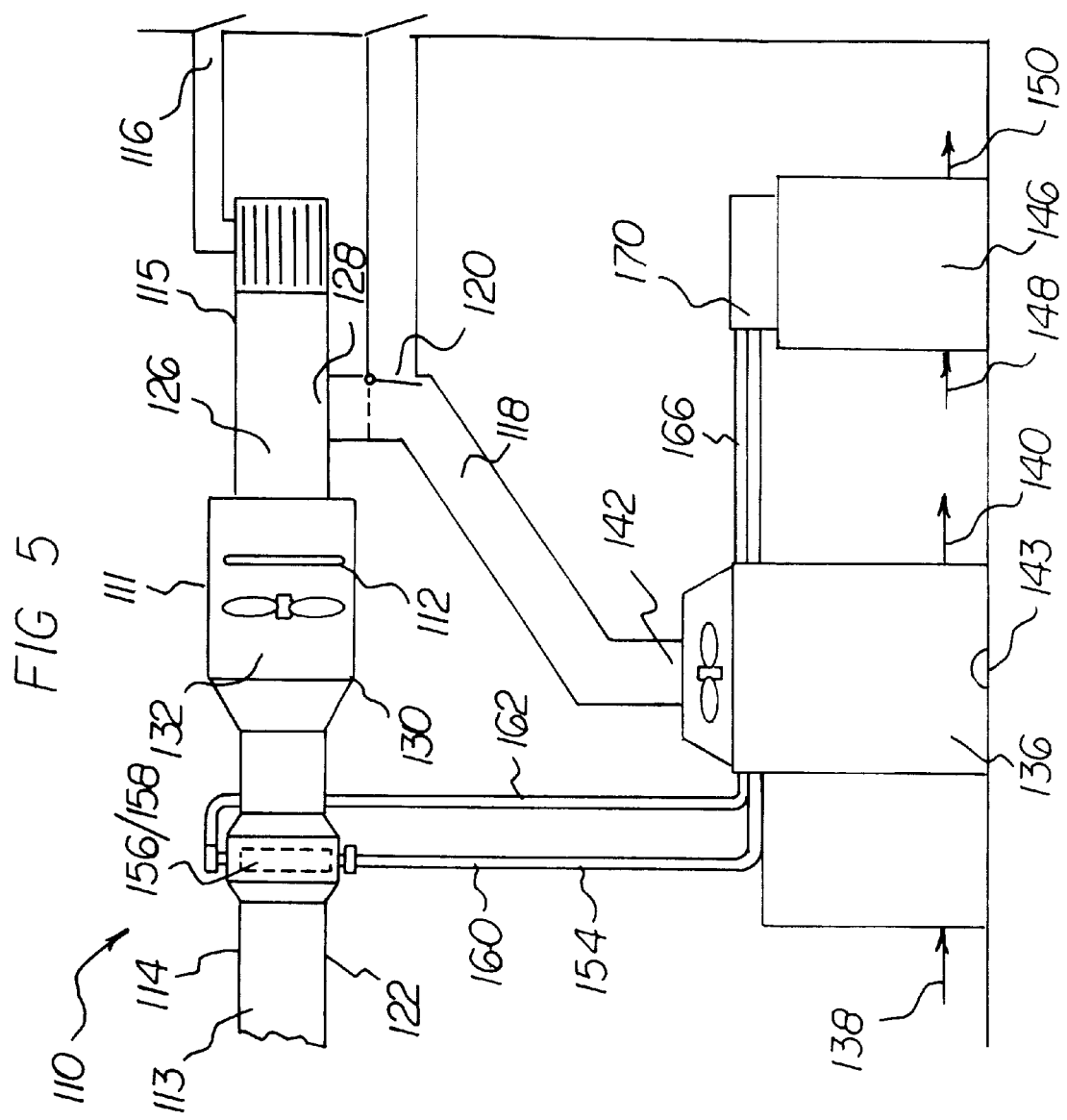
FIG. 5 is schematic illustration of an alternate embodiment of the present invention.

An alternate embodiment includes a heat transfer system 110 shown in FIG. 5. Such system comprises an air conditioner 111 that includes an evaporator 112.

Secondly, the system includes a chamber 113. The chamber has an air duct 114 comprised of an input end 115 for receiving fresh ambient make up air 116 and for also receiving recycled air 118 as determined by a movable damper 120. An output end 122 moves conditioned air past the evaporator and into the chamber. Intermediate zones lie there between. There are a plurality of intermediate zones including a return air zone 126, a make up air zone 128, an air handler zone 130, and an air supply zone 132 which controls the air flow of the ambient make up air and recycled air.

Thirdly, the system includes a distiller 136 with an input end 138 to receive water from a feed water source, an output 140, and an exhaust chimney 142 to direct the flow of excess heat and recycled air to atmosphere or for recirculation. The distiller also has a heater element 143.

Fourthly, the system includes a hot water tank 146. The hot water tank 146 has an input line 148 and an output line 150.

Next the system includes a first passive transfer assembly 154. This first passive transfer assembly has a pair of coils, including an input coil 156 and an output coil 158, and a pair of lines 160, 162 connecting the coils there between forming a closed loop for a first working fluid to pass. The input coil are located in operative association with the exhaust chimney of the distiller and the output coil is located in operative association with the output end of the air duct.

Finally the system includes a second passive transfer assembly 166. The second passive transfer assembly having a pair of coils, including an input coil 168 and an output coil 170, and a pair of lines 172, 174 connecting the coils there between forming a closed loop for a second working fluid to pass. The input coil is located in operative association with the exhaust chimney of the distiller and the output coil is located in operative association with the input lines of the hot water tank.

Figure 6:
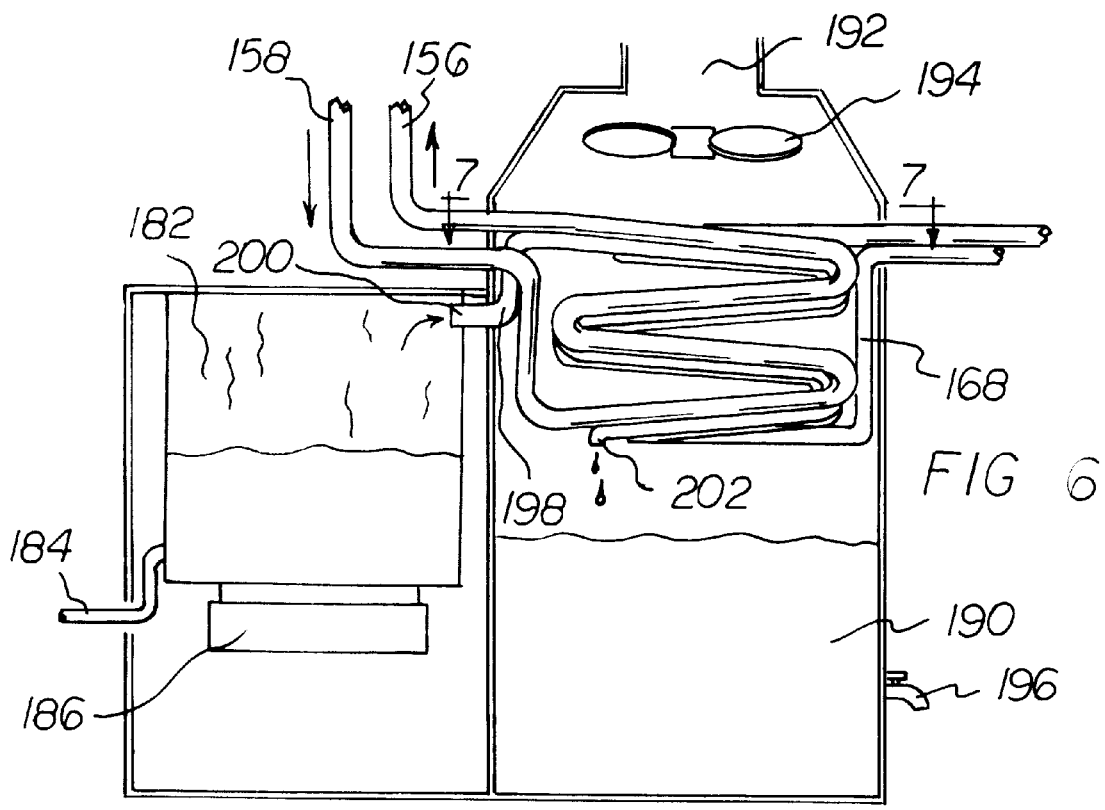
FIG. 6 is a cross sectional view of the distiller shown in FIG. 5.
Figure 7:
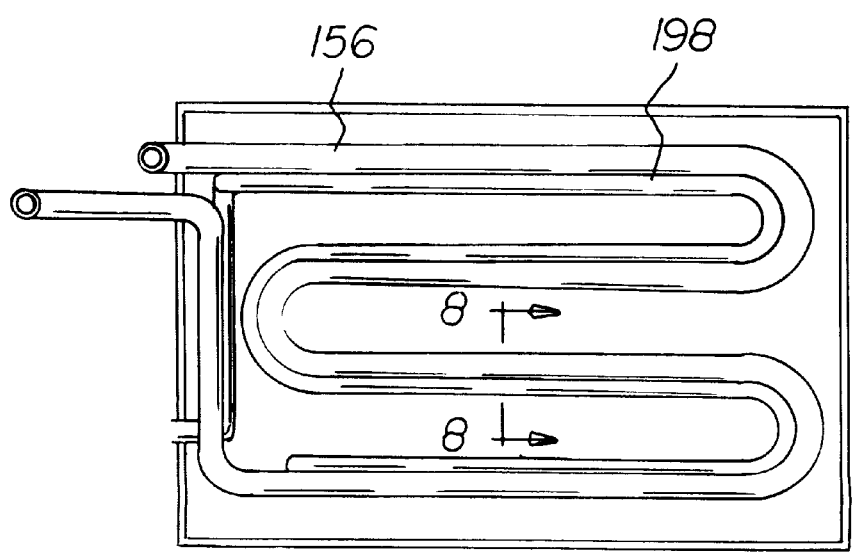
FIG. 7 is a cross sectional view of the distiller taken along line 7—7 of FIG. 6.

One embodiment of the above mentioned distiller is shown in FIGS. 6 and 7. Such a distiller 136 comprises a first region 182 that has a water input line 184 and a heating element 186 adapted to produce steam.

Next, the distiller includes a second region 190. The second region has an exhaust chimney 192, a fan 194 and a water output line 196 and houses the heated coils of the first and second passive transfer systems.

Finally, the distiller includes a serpentine heating coil 198. The serpentine heating coil lies in the second chamber and has an input end 202 in the first chamber and an output end 200 emptying into the second chamber. The serpentine heating coil lies operatively to the input coils of the first and second passive transfer systems, such that the heat generated from the steam in the first chamber in funneled into the serpentine heating coil. This heat is then transferred to the input coils of the first and second passive transfer systems causing the steam to condense to water and drain into the second chamber.

The association of the input coils of the first and second passive transfer system and the serpentine heating coils may vary within the scope of the present invention. In one embodiment shown in FIG. 8 the input coils of the first and second passive transfer system lie adjacent to the external surface of the serpentine heating coil. In a second embodiment shown in FIG. 9 the input coils of the first and second passive transfer system lie within the serpentine heating coil. A third embodiment shown in FIG. 10 the input coils of the first and second passive transfer systems are split into a plurality of lines and lie within the serpentine heating coil to further increase the transfer of heat.

Figure 11:
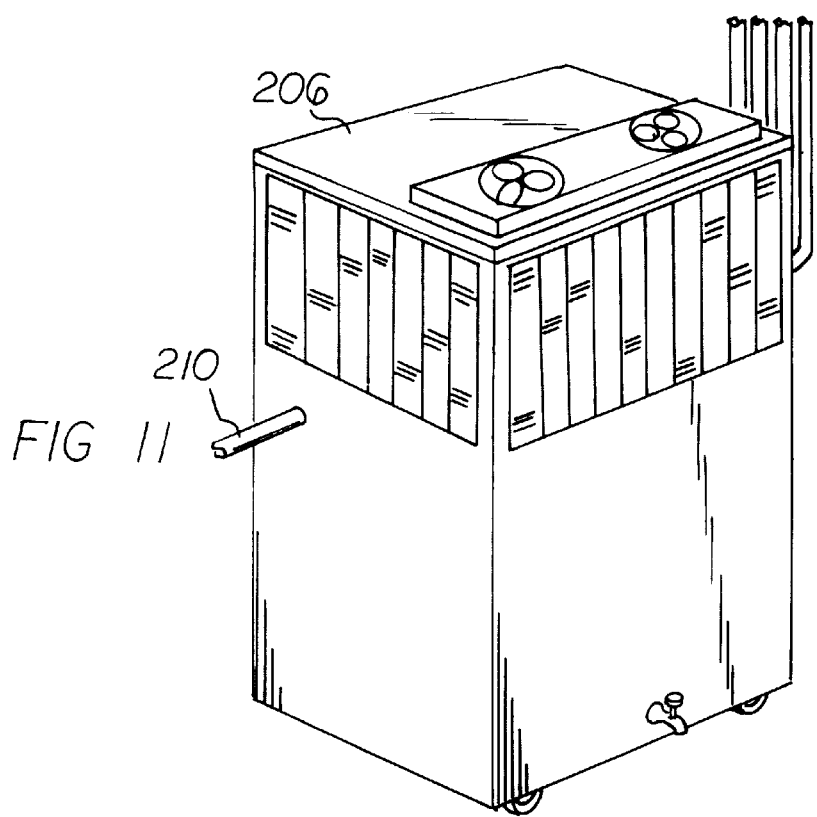
FIG. 11 is a perspective illustration of an alternate embodiment of a distiller.
Figure 12:
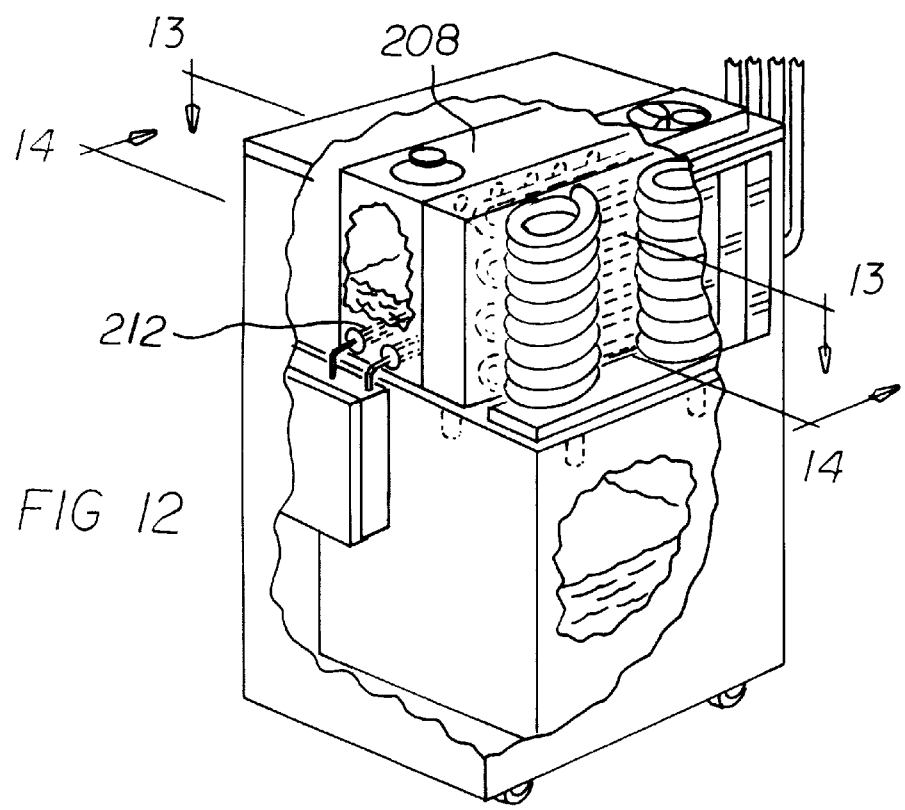
FIG. 12 is a perspective illustration, partly in cross section, of the inside of the distiller of FIG. 11.

A further embodiment comprises of a distiller 206 of the heat transfer system. See FIG. 11. The distiller includes a first region 208. Such first region has a water input line 210 and a heating element 212 adapted to produce steam.

Figure 13:
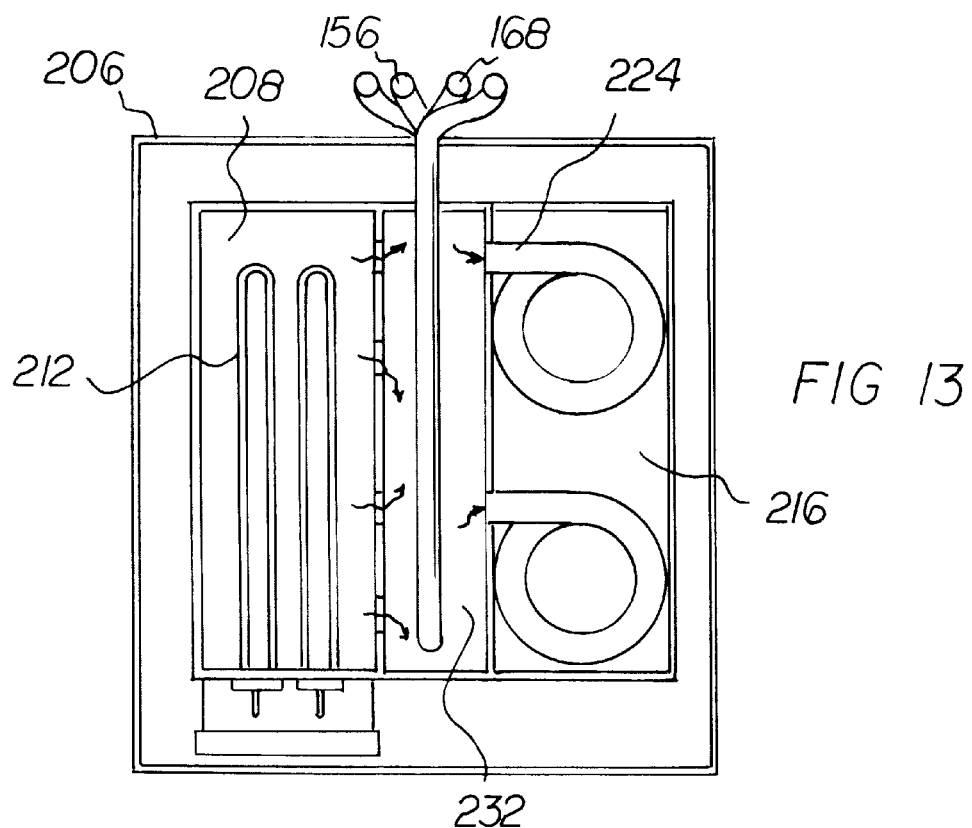
FIG. 13 is a cross sectional view taken along line 13—13 of FIG. 12.
Figure 14:
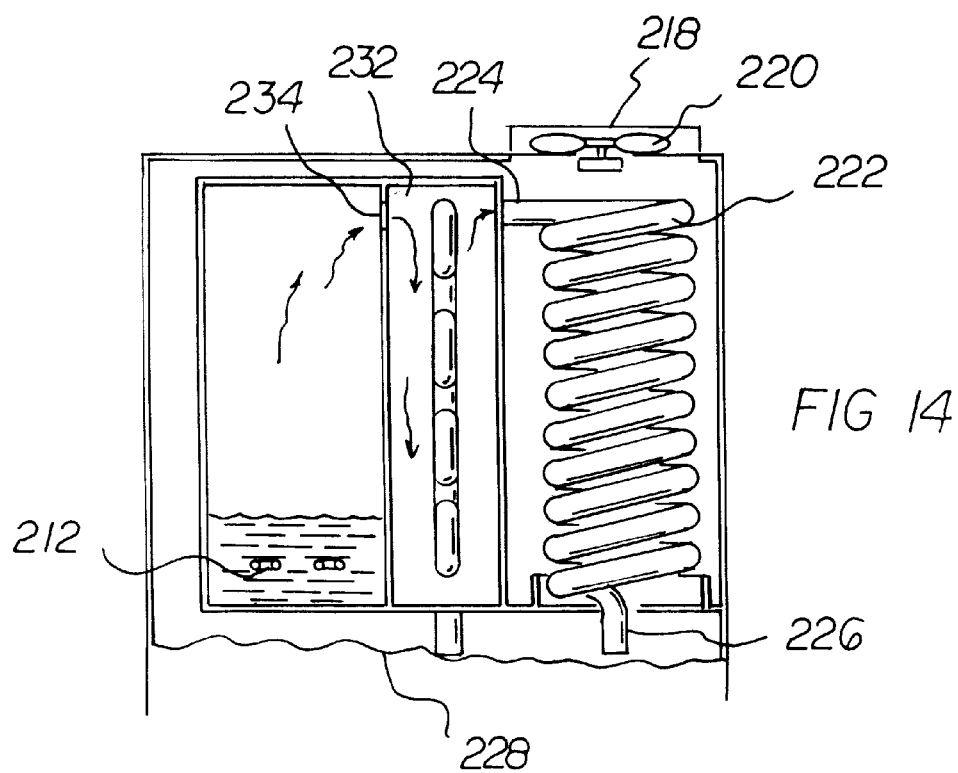
FIG. 14 is a cross sectional view taken along line 14—14 of FIG. 12.

The distiller further has a second region 216, FIG. 13, with an exhaust chimney 218, FIG. 14, a fan 220 and a plurality of condensing coils 222 each with an input end 224 and an output end 226. The output end empties into a reservoir 228.

Finally, the distiller includes a third region 232, FIG. 13, that lies between the first and second regions. The third region has apertures 234, FIG. 14, to facilitate the transfer of steam from the first region to the third region and houses the input ends of the condensing coils to dispose of the steam. The third region further housing the input coils of the first and second passive transfer systems.

Yet a further embodiment comprises of a distiller 240 of the heat transfer system is shown in 15 and 16.

The distiller includes a first region 244. The first region has a water input line 246 and a heating element 248 adapted to produce steam and housing the input coils of the first and second passive transfer systems.

The distiller also includes a second region 252. The second region has an exhaust chimney 254, a fan 256 and a plurality of condensing coils 258 each with an input end 260 and an output end 262. The input ends lie within the first region to dispose of the steam, and the output ends emptying into a reservoir 264.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A heat transfer system for optimizing the heat gained and lost during air conditioning and water purification comprising, in combination:

an air conditioner for manipulating temperature and circulating air with components including an expansion valve, an evaporator, a compressor, a condenser, a closed line with a working fluid therein operatively coupling such component wherein, the compressor increases the pressure of the working fluid thus raising the temperature of the working fluid, the condenser then releases this heat into an environment adjacent the condenser preferably into an external environment then the working fluid passes through the expansion valve the pressure of the working fluid is then dropped which lowers the temperature, the cool working fluid then passes through the evaporator where the working fluid absorbs heat from an environment adjacent to the evaporator preferably an internal environment before entering the compressor again;

a chamber having an air duct comprised of an input end for receiving fresh ambient make up air and for also receiving recycled air, an output end to move conditioned air passed the evaporator and into the chamber, with intermediate zones there between, the intermediate zones including a return air zone which collects recycled air and heat, a make up air zone which collects ambient make up air, an air handler zone which comprises the air conditioner evaporator and allows the ambient make up air and recycled air to come in contact with the evaporator of the air conditioner, and an air supply zone which controls the air flow of the ambient make up air and recycled air with a fan for moving the air to the output end of the air duct;

a distiller for purifying water through heat vaporization with an input end to receive water from a feed water source, outputs including a first line to pass purified water to a hot water tank, a second line to feed water to a cold water supply and a third line to feed water to a chilled water loop and an exhaust chimney to direct the flow of excess heat and recycled air to atmosphere or for recirculation, and a heater element to effect the water purification through distillation within the distiller;

a conduit with a hollow configuration adapted to carry the excess heat and recycled air from the exhaust chimney having an input region coupled to the exhaust chimney of the distiller and an output region adapted to couple to the return air zone of the air duct when in a first mode, the output region is also adapted to route the heat and recycled air to the environment outside the chamber when in a second mode with a damper movable between the first and second mode, the conduit transfers the heat and recycled air from the distiller to the ambient make up air of the return side of the evaporator and make up air zone of the air duct and drives the moisture from the ambient make up air, and the conduit is adapted to transfer the heat to outside the chamber when the air conditioner is not in use and the damper is engaged;

a thermosyphon having a pair of ends with a coil at each end thereof and a pair of lines connecting the coils there between forming a closed loop for a second working fluid to pass, the first heated end being located in operative association with the exhaust chimney of the distiller and the second chilled end located in operative association with the second output end of the air duct, the line having a control valve adapted to be controlled manually and by a humidostat to manipulate the degree of reheating done to the conditioned output air of the air supply zone, the excess heat of the exhaust chimney of the distiller adapted to raise the temperature of the second working fluid of the first heated end of the thermosyphon which is adapted to lower the temperature of the second working fluid at the second chilled end which in turn will absorb heat from conditioned output air at the air supply zone; and a secondary hot water tank fed by water from the distiller by a line and a secondary thermosyphon to heat the water in the secondary hot water tank.

2. A heat transfer system comprising:

an air conditioner including an evaporator;

a chamber having an air duct comprised of an input end for receiving fresh ambient make up air and for also receiving recycled air, an output end to move conditioned air passed the evaporator and into the chamber, with intermediate zones there between, the intermediate zones including a return air zone, a make up air zone, an air handler zone, and an air supply zone which controls the air flow of the ambient make up air and recycled air;

a distiller with an input end to receive water from a feed water source, an outputs, and an exhaust chimney to direct the flow of excess heat and recycled air to atmosphere or for recirculation, and a heater element;

a passive transfer assembly having a pair of ends with a coil at each end thereof and a pair of lines connecting the coils there between forming a closed loop for a second working fluid to pass, the first heated end being located in operative association with the exhaust chimney of the distiller and the second chilled end located in operative association with the second output end of the air duct.

3. The system as set forth in claim 2 and including a conduit with a hollow configuration adapted to carry the excess heat and recycled air from the exhaust chimney having an input region coupled to the exhaust chimney of the distiller and an output region adapted to couple to the return air zone of the air duct when in a first mode, the output region is also adapted to route the heat and recycled air to the environment outside the chamber when in a second mode with a damper movable between the first and second mode, the conduit transfers the heat and recycled air from the distiller to the return side of the air conditioner and a supplemental winter heater and the conduit is adapted to transfer the heat to outside the chamber when and the damper is engaged.

4. The system as set forth in claim 2 and including the line having a control valve adapted to be controlled by a humidostat to manipulate the degree of reheating done to the conditioned output air of the air supply zone, the excess heat of the exhaust chimney of the distiller adapted to raise the temperature of the second working fluid of the first heated end of the thermosyphon which is adapted to lower the temperature of the second working fluid at the second end which in turn will add heat to conditioned output air at the air supply zone.

5. The system as set forth in claim 2 and further including a secondary passive transfer assembly having a first end following the first mentioned passive transfer assembly and a second end adapted to modify the temperature adjacent to the second end.

6. The system as set forth in claim 2 and including a secondary hot water tank fed by water from the distiller by a line and a secondary passive transfer assembly to heat the water in the secondary hot water tank.

7. A heat transfer system comprising:

an air conditioner including an evaporator;

a chamber having an air duct comprised of an input end for receiving fresh ambient make up air and for also receiving recycled air, an output end to move conditioned air passed the evaporator and into the chamber, with intermediate zones there between, the intermediate zones including a return air zone, a make up air zone, an air handler zone, and an air supply zone which controls the air flow of the ambient make up air and recycled air;

a distiller with an input end to receive water from a feed water source, an output, and an exhaust chimney to direct the flow of excess heat and recycled air to atmosphere or for recirculation, the distiller also having a heater element;

a hot water tank having an input line and an output line;

a first passive transfer assembly having a pair of coils, including an input coil and an output coil, and a pair of lines connecting the coils there between forming a closed loop for a first working fluid to pass, the input coil being located in operative association with the exhaust chimney of the distiller and the output coil being located in operative association with the output end of the air duct; and a second passive transfer assembly having a pair of coils, including an input coil and an output coil, and a pair of lines connecting the coils there between forming a closed loop for a second working fluid to pass, the input coil being located in operative association with the exhaust chimney of the distiller and the output coil being located in operative association with the input lines of the hot water tank.

8. The heat transfer system as set forth in claim 7 wherein the distiller comprises:

a first region having a water input line and a heating element adapted to produce steam;

a second region having an exhaust chimney, a fan and a water output line and housing the heated coils of the first and second passive transfer systems;

a serpentine heating coil lying in the second chamber and having an input end in the first chamber and an output end emptying into the second chamber, the serpentine heating coil lying operatively to the input coils of the first and second passive transfer systems, such that the heat generated from the steam in the first chamber in funneled into the serpentine heating coil which transfers that heat to the input coils of the first and second passive transfer systems causing the steam to condense to water and drain into the second chamber.

9. The heat transfer system as set forth in claim 8 wherein the input coils of the first and second passive transfer system lie adjacent to the external surface of the serpentine heating coil.

10. The heat transfer system as set forth in claim 8 wherein the input coils of the first and second passive transfer system lie within the serpentine heating coil.

11. The heat transfer system as set forth in claim 8 wherein the input coils of the first and second passive transfer systems are split into a plurality of lines and lie within the serpentine heating coil to further increase the transfer of heat.

12. The heat transfer system as set forth in claim 7 wherein the distiller comprises:
   a first region having a water input line and a heating element adapted to produce steam;
   a second region having an exhaust chimney, a fan and a plurality of condensing coils each with an input end and an output end, the output ends emptying into a reservoir; and
   a third region lying between the first and second regions having an aperture to facilitate the transfer of steam from the first region to the third region and housing the input ends of the condensing coils to dispose of the steam, the third region further housing the input coils of the first and second passive transfer systems.

13. The heat transfer system as set forth in claim 7 wherein the distiller comprises:
   a first region having a water input line and a heating element adapted to produce steam and housing the input coils of the first and second passive transfer systems; and
   a second region having an exhaust chimney, a fan and a plurality of condensing coils each with input ends and output ends, the input ends lying within the first region to dispose of the steam, and the output ends emptying into a reservoir.

* * * * *